United States Patent [19]

Kataoka et al.

[11] Patent Number: 4,489,951
[45] Date of Patent: Dec. 25, 1984

[54] MECHANICAL SEAL

[75] Inventors: Tadashi Kataoka; Hirokuni Hiyama, both of Kanagawa, Japan

[73] Assignee: Ebara Corporation, Tokyo, Japan

[21] Appl. No.: 523,944

[22] Filed: Aug. 17, 1983

[51] Int. Cl.³ .............................................. F16J 15/36
[52] U.S. Cl. .......................................... 277/83; 277/3
[58] Field of Search .................. 277/81 R, 83, 174, 3, 277/27

[56] References Cited

U.S. PATENT DOCUMENTS

| | | | |
|---|---|---|---|
| 2,396,319 | 3/1946 | Edwards et al. | 277/83 |
| 3,518,020 | 6/1970 | Lake | 277/83 |
| 3,603,601 | 9/1971 | Blomeyer | 277/83 |
| 4,087,097 | 5/1978 | Bossens et al. | 277/83 |
| 4,371,173 | 2/1983 | Kotzur | 277/83 |

Primary Examiner—Robert I. Smith
Attorney, Agent, or Firm—Oblon, Fisher, Spivak, McClelland & Maier

[57] ABSTRACT

A mechanical seal is disclosed wherein an intermediate floating ring is employed between a seat sleeve and a rotary ring. Each of the rotary ring, intermediate floating ring and the seat sleeve are pressed against each other so as to be relatively rotatable at their respective abutting interfaces, each of the rotary ring, intermediate ring and the seat sleeve being separated from each other with proper clearances between the opposing surfaces thereof at places which are outward of the sliding interfaces and each of the opposing surfaces is provided with an annular groove and a cascade of blades therein so that a fluid coupling is formed between the adjacent opposing surfaces.

6 Claims, 16 Drawing Figures

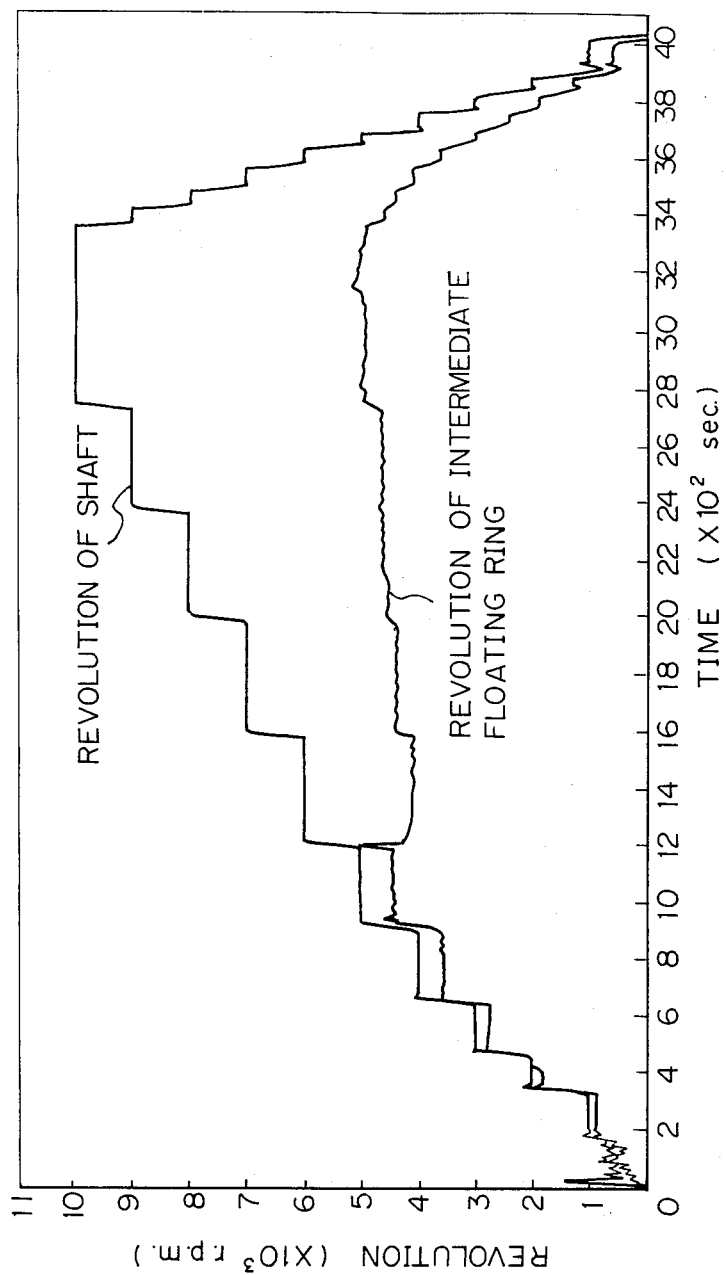

MECHANICAL SEAL

FIELD OF THE INVENTION

The present invention relates to a mechanical seal and more particularly to a mechanical seal in which an intermediate floating ring is employed.

BACKGROUND OF THE INVENTION

A mechanical seal provided with an intermediate floating ring has heretofore been used in a machine operated under a high revolutional speed, such as a pump, a compressor and a turbine, in order to decrease the relative sliding speed of the elements concerned. However, in practice, the reduction of the relative sliding speed due to the presence of the intermediate floating ring is only possible when the coefficient of dynamic friction and the coefficient of static friction are at least equal. Since the coefficient of static friction is, in fact, generally larger than the coefficient of dynamic friction, the reduction of the relative sliding speed has not been achieved by the intermediate floating ring of prior art. Thus, the intermediate floating ring has been conveniently utilized merely for the purpose of dissipating generated heat, preventing deformation of the related elements, etc.

Also, it has been devised to provide blades on the outer peripheral surface of the intermediate ring so as to rotate the ring at a preferable range of speed slower than the rotational speed of the shaft by directing the hydraulic force of the lubricating oil or the like to the blades. However, the amount of the lubricating oil to be circulated is determined basically depending on the heat generated by the frictional sliding and, therefore, it would be difficult for such hydraulic force to rotate the intermediate ring at a proper speed overcoming the sliding friction and thus, this approach has not been put into practice.

SUMMARY OF THE INVENTION

Accordingly, it is an object of the present invention to provide a mechanical seal having an intermediate floating ring which may be rotated at a speed definitely slower than the rotational speed of the shaft.

According to the present invention, the object above is accomplished. In the mechanical seal constructed according to the present invention, a plurality of blades or vanes are formed in an annular arrangement on each of the opposing surfaces of a rotary or contact ring, an intermediate floating ring and a seat sleeve or ring so that, under the presence of the fluid medium, a series of these blades or a cascade of blades on one surface interact with the other cascade of the blades on the opposing surface to transmit torque therebetween when the shaft is rotated together with the rotary ring. Upon the rotation, torques produced as above on the opposite sides of the intermediate ring reach a condition that they are balanced with each other to rotate the intermediate ring constantly at a preferable range of speed slower than that of the shaft rotation.

Now the present invention will be explained in detail referring to the accompanying drawings, brief explanation of which is given below.

BRIEF EXPLANATION OF THE DRAWINGS

FIG. 16 illustrates data taken by using the embodiment shown in FIGS. 14 and 15.

DETAILED DESCRIPTION OF THE PREFERRED EMBODIMENT

Figure 1:
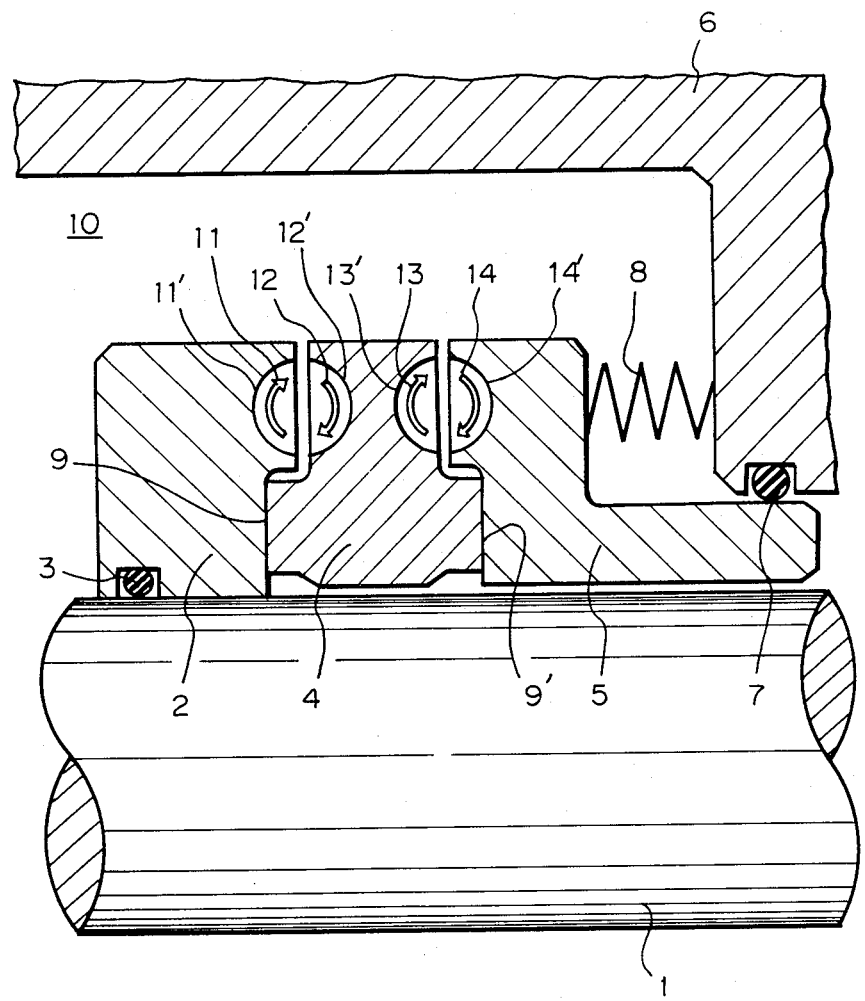
FIG. 1 is a schematic longitudinal cross sectional view of a mechanical seal of an embodiment according to the present invention.

Referring to FIG. 1, a cross sectional view of a preferred embodiment according to the present invention is illustrated. In FIG. 1, the right hand of the drawing is a chamber such as a high pressure gas chamber and left hand is directed to open air through a sealing means such as a throttle bushing (not shown).

A rotary ring 2 is securely mounted on a shaft 1 with a sealing ring 3 interposed therebetween so as to be rotated with the shaft 1. A seat ring or sleeve 5 is inserted in the bore of a housing 6 with a sealing ring 7 interposed therebetween so as to be axially displaceable but unrotatable around the shaft 1. An intermediate floating ring 4 is disposed around the shaft 1 between the rotary ring 2 and the seat sleeve 5 so as to be rotatable around the shaft 1. Between the seat sleeve 5 and the end wall of the housing 6, a biasing means, such as springs 8, is disposed so as to axially urge the seat sleeve 5 and the intermediate ring 4 agaist the rotary ring 2 whereby a sliding interface 9 between the rotary ring 2 and the intermediate ring 4 and a sliding interface 9' between the intermediate ring 4 and the seat sleeve 5 receive pressure thereon, respectively. A seal chamber 10 is filled with a fluid medium such as lubricating oil or water which may be utilized as fluid capable of transmitting torque.

The rotary ring 2, intermediate floating ring 4 and seat sleeve 5 abut each other at the interfaces 9 and 9' and are slightly separated from each other at portions which are radially on the outer side of the abutting interfaces so that each surface of the ring 2, ring 4 and sleeve 5 are in parallel opposition to each other with a proper clearance therebetween.

Figure 2:
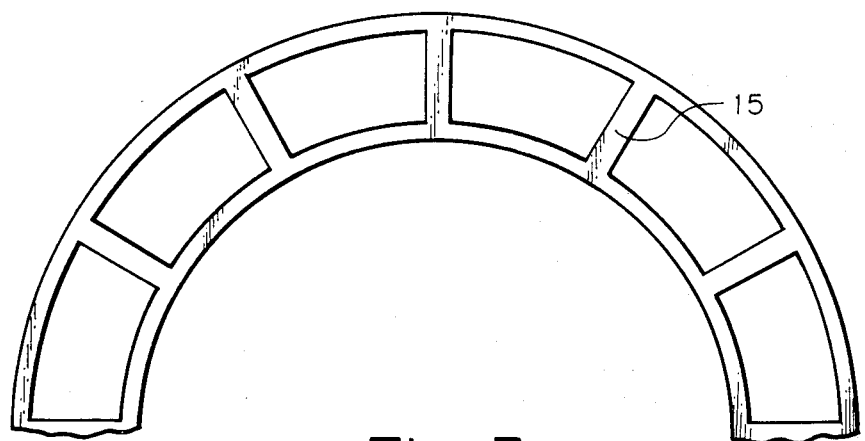
FIG. 2 shows an arrangement of a cascade of blades on one of the opposing surfaces of the rotary ring, intermediate ring or the seat sleeve.

On each of these opposing surfaces, an annular groove is provided, each with the same radial distance from the axis of the shaft 1. That is, on the surface of the rotary ring 2 facing the intermediate ring 4, an annular groove 11' is formed, an annular groove 12' on the surface of the intermediate ring facing the rotary ring 2, an annular groove 13' on the surface of the intermediate ring 4 facing the seat sleeve 5 and an annular groove 14' on the end surface of the sleeve 5 facing the intermediate ring 4. All of the annular grooves 11', 12', 13' and 14' are of a semi-circular shape in their cross section and are positioned at the same radial distance from the axis of the shaft on each of the surfaces. A plurality of semi-circular blades 15 are disposed in each of these grooves generally radially to separate the grooves and each series of blades 15 or cascade of blades in each of the grooves 11', 12', 13' and 14' is identified as 11, 12, 13 and 14, respectively. A typical arrangement of the blades 15 in the respective grooves is illustrated in FIG. 2 and the blades are disposed with equal separating distance between them. By the arrangement of the blades 15 as above, a fluid coupling is formed at the radially outward position of the interface 9 by the cascades of blades 11 and 12 and, similarly, a fluid coupling at the outer position of the interface 9' by the cascades of blades 13 and 14.

When the shaft 1 is rotatably driven, the rotary ring 2 is rotated therewith and a fluid within the cascade 11 is caused to circulate in the direction of the arrow mark shown in FIG. 1. The fluid outgoing from the cascade 11 enters into the cascade 12 to provide torque to the intermediate floating ring 4 so as to rotate the same. Upon rotation of the intermediate floating ring 4, the cascade 13 on the opposite side surface of the ring 4 exhibits a pumping effect to circulate the fluid in the direction of the arrow mark shown in FIG. 1. Since the seat sleeve 15 having the cascade 14 does not rotate, the cascade 13 on the ring 4 receives reaction torque in the direction opposite to its rotating direction which is that of the ring 4.

Figure 3:
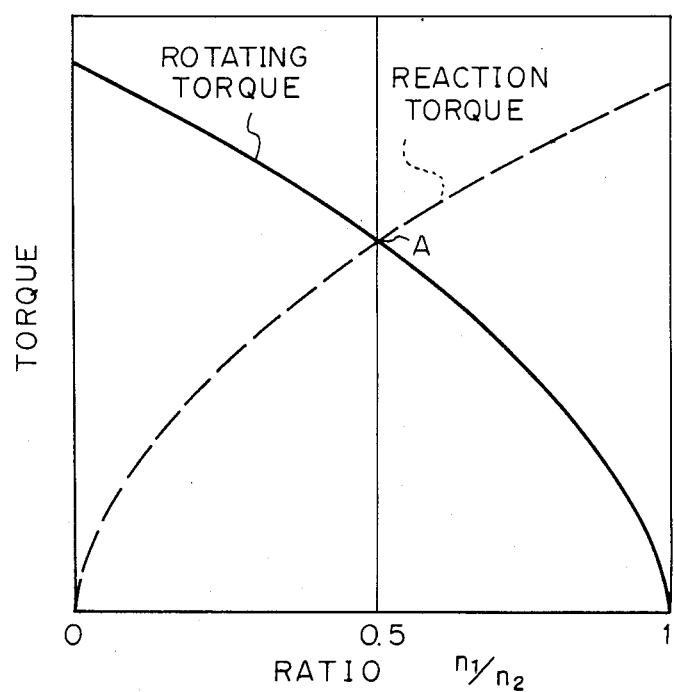
FIG. 3 illustrates characteristic curves of torque transmission in the embodiment shown in FIG. 1.

Now, in FIG. 3, there is shown a curve of the rotating torque given to the intermediate floating ring 4 from the rotating ring 2 upon rotation thereof and a curve of the reaction torque given to the intermediate ring 4 from the seat sleeve 5 when the shaft 1 and the ring 4 rotate, the curves being only examples representing a typical trend. Both curves are drawn relative to $n_1/n_2$ wherein $n_1$ is a revolution of the ring 4 per unit of time and $n_2$ is the number of revolutions of the shaft 1 in the same unit of time. Both curves intersect each other at the point A and the ring 4 rotates at the revolution ratio $n_1/n_2$ corresponding to this point A. If the cascades 11, 12, 13 and 14 are appropriately arranged so that the point A coincides $n_1/n_2$ at 0.5 as illustrated in FIG. 3, the intermediate ring 4 will rotate at half that of the rotational speed of the shaft 1. In the case where the point A is at $n_1/n_2=0.5$, relative sliding speed at the interfaces 9 and 9' becomes half of the speed where the intermediate ring 4 is not present. The ratio of $n_1/n_2=0.5$ is preferred. However, the ratio is dependent on the features of the rotating torque and reaction torque which may be also dependent on the arrangement of the cascades of blades 11, 12 and 13, 14. The ratio of $n_1/n_2$, in practice, is not limited to 0.5 and another value may be selected so that the rotational speed of the intermediate floating ring becomes slower than the rotational speed of the shaft 1.

Figure 4:
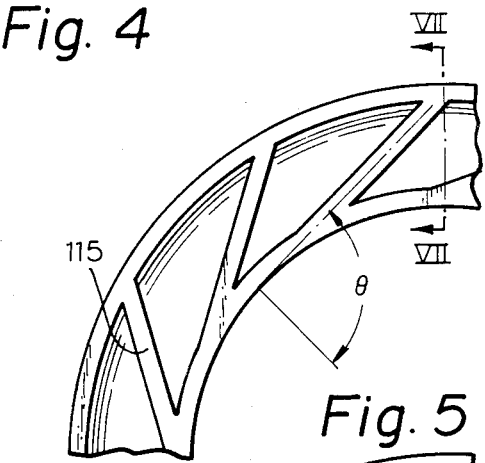
FIG. 4 illustrates another arrangement of blades on one of the opposing surfaces.
Figure 7:
FIG. 7 is a cross sectional view taken along line VII—VII in FIG. 4.
Figure 5:
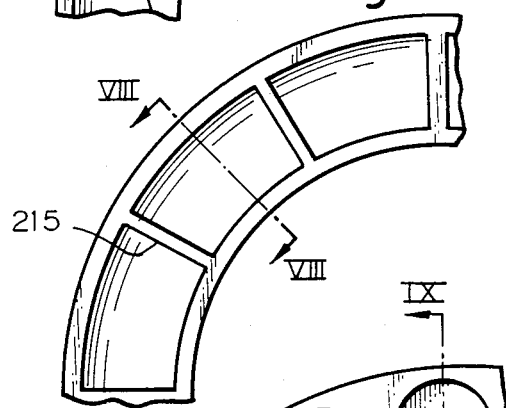
FIG. 5 illustrates a still further arrangement of blades.
Figure 8:
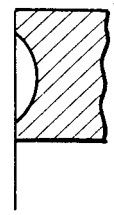
FIG. 8 is a cross sectional view taken along line VIII—VIII in FIG. 5.
Figure 6:
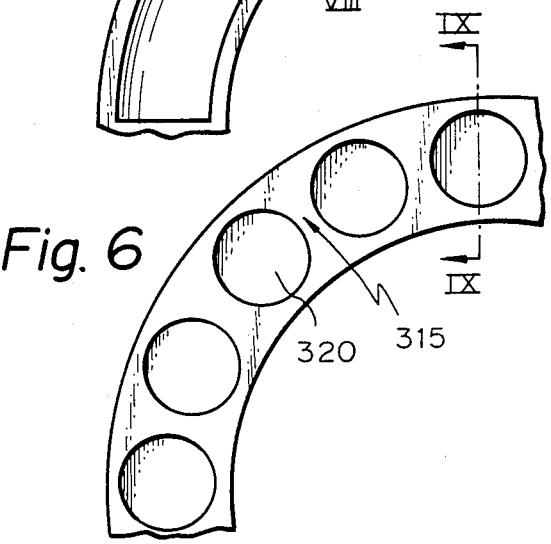
FIG. 6 illustrates another form of the equivalent blades.

In the embodiment explained above, the combinations of the cascades 11 and 12 and the combination of the cascades 13 and 14 constitute means somewhat similar to a fluid coupling, respectively. Therefore, the blades 15 of these cascades may take another shape and arrangement such as illustrated in FIGS. 4, 5 and 6 as the front views of the modified cascade of blades and in FIGS. 7, 8 and 9 as the cross sectional side views of the grooves for the blades. In FIG. 4, the blades 115 are disposed in the groove so that each blade 115 forms a certain angle $\theta$ relative to the radial direction. The cross sectional view of the groove in FIG. 4 is shown in FIG. 7 as a semi-circular shape. The arrangement shown in FIG. 4 is suitable in cases where the rotating direction is fixed in one direction and it enables the hydrodynamic loss to be reduced in transmitting torque. The arrangement shown in FIG. 5 is the same as that shown in FIG. 2 as far as the front views of the cascade of blades are concerned; however, as illustrated in FIG. 8, the cross sectional view of the groove is different from that shown in FIG. 1 in the point that the groove is shallow. Thus blades 215 in this modification are made smaller than those of FIG. 1. This modification affords the advantage of easy fabrication of the elements concerned.

In the foregoing embodiments, the blades have been explained to be disposed in the annular grooves so as to separate them radially. However, in FIG. 6, there is shown a further modified form wherein a plurality of blind holes 320 are provided on each of the opposing surfaces of the rotary ring, intermediate ring and seat sleeve with equal spacing circumferentially at the radially outer portion of the interfaces of the mechanical seal abutting each other.

Figure 9:
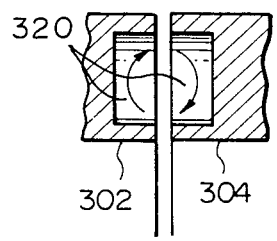
FIG. 9 is a cross sectional view taken along line IX—IX in FIG. 6.

The boundary areas 315 between the adjacent holes 320 serve to function as blades. In the broad sense, therefore, the boundary areas 315 are regarded as blades in the present specification and appended claims. As shown in FIG. 9, the fluid flows in the holes 320 of the rotary ring 302 and the intermediate ring 304 in the direction indicated by the arrows provided that the shaft is disposed below the illustrated elements as viewed in this drawing. Among the embodiments explained hereinabove, the arrangement shown in FIGS. 6 and 9 provides the most economical fabrication process for the concerned elements. The arrangement of the cascades of blade may not necessarily be hydrodynamically ideal and any design may be applicable provided that the fluid flow produced in the driving side element is directed to the driven side element and the curves of the driving torque and the reaction torque intersect each other in a manner similar to that as illustrated in FIG. 3.

Figure 10:
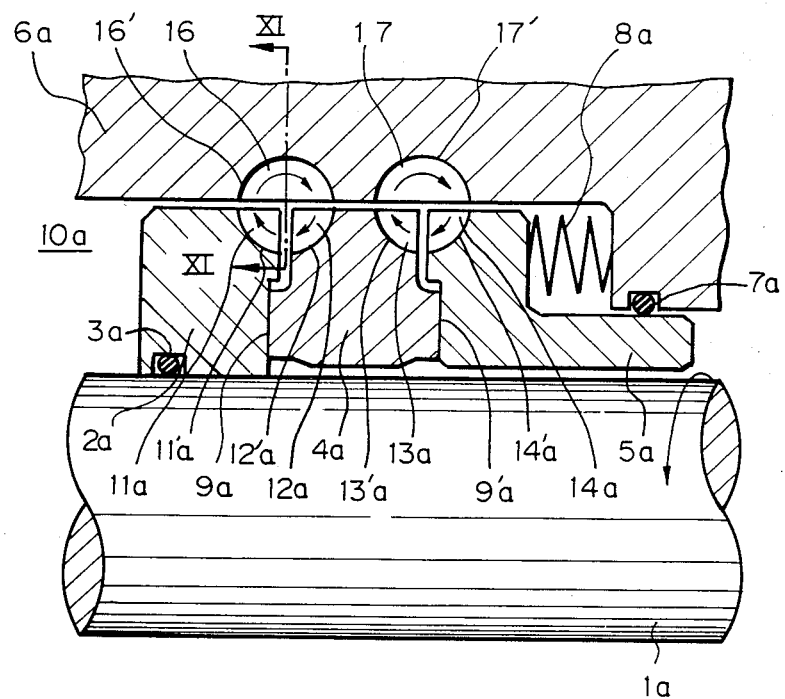
FIG. 10 shows another embodiment in cross section.
Figure 11:
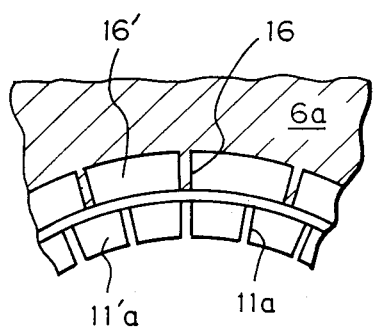
FIG. 11 shows a cross sectional view taken along line XI—XI in FIG. 10.

Referring to FIG. 10, there is shown another preferred embodiment according to the present invention in a cross sectional view. This embodiment is substantially the same except for certain portions regarding the cascades of blades as illustrated in FIGS. 1 and 2. Accordingly, the same references apply as those in FIGS. 1 and 2 for the elements similar thereto, each with a suffix "a" so that references not specifically explained hereinafter with respect to FIG. 10 are to be referred to in the explanation regarding FIGS. 1 and 2 with respect to the same references having no suffix "a". The outer peripheral surfaces of the rotary ring 2a, intermediate floating ring 4a and seat sleeve 5a are arranged to oppose the internal cylindrical surface of the seal chamber 10a with a proper clearance similar to those between the opposing surfaces having the cascades of blades of the rotary ring and intermediate ring or between the intermediate ring and seat sleeve. Circular or annular grooves 11'a, 12'a and 16' are formed on the outer peripheral edge of the rotary ring 2a, on the opposing outer peripheral edge of the intermediate ring 4a and on the internal cylindrical surface of the housing 6a. As viewed in FIG. 10, these grooves 11'a, 12'a and 16' form a substantially complete circle in their cross sections. Similarly, grooves 13'a, 14'a and 17' are formed on the intermediate ring 4a, seat sleeve 5a and the housing 6a. Each of the grooves 11'a, 12'a, 13'a and 14'a is of a quadrant shape in its cross section and each of grooves 16' and 17' is of a semi-circular shape in its cross section. Within these grooves 11'a, 12'a, 13'a, 14'a, 16' and 17', cascades of blades 11a, 12a, 13a, 14a, 16 and 17 are arranged in a manner similar to that of the cascades of blades in FIGS. 1 and 2. A cross sectional view taken along the line XI—XI in FIG. 10 is illustrated in FIG. 11 wherein the cascade 16 in the groove 16' and the cascade 11a in the groove 11'a are illustrated. The other cascade is also similar and modification of these blades is also available as in the foregoing FIGS. 4 thru. 9. In the embodiment illustrated in FIG. 10, the direction of fluid flow is shown by an arrow in each of the grooves. The proper selection of the number and angular orientation of blades in the grooves 16' and 17' may facilitate adjustment of the transmitting torque and prevention of the intermediate ring 4a from being applied with excessive reaction torque.

Figure 12:
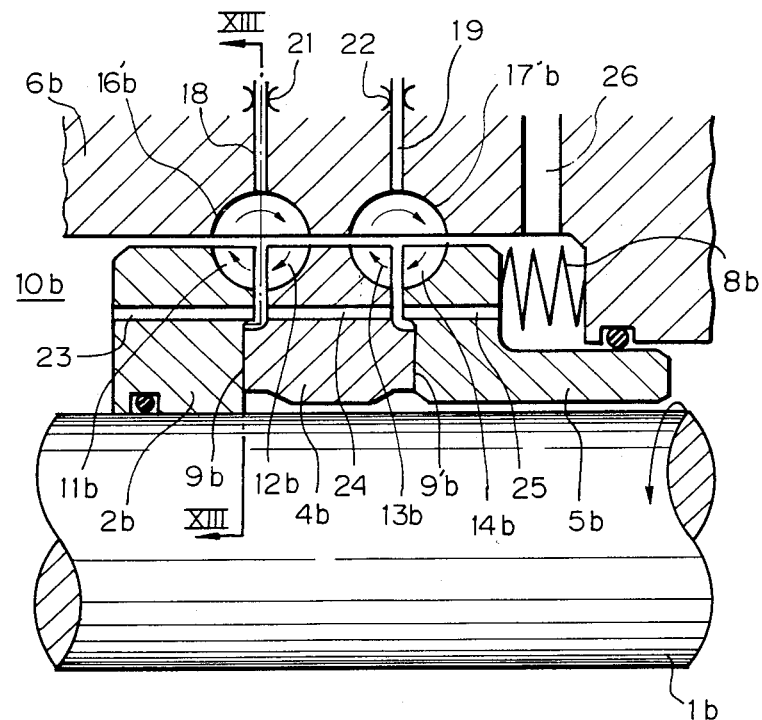
FIG. 12 shows a still further embodiment in cross section.
Figure 13:
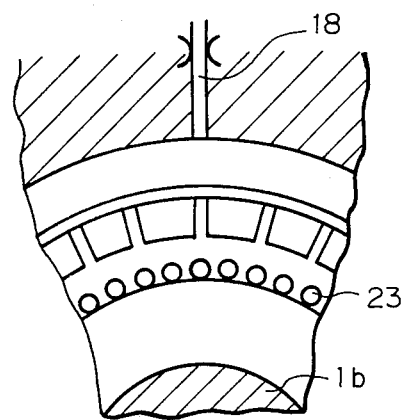
FIG. 13 shows a cross sectional view taken along line XIII—XIII in FIG. 12.

In FIG. 12, is shown a further modified embodiment according to the present invention wherein the same or similar elements as those in the previous embodiments are given the same references as those in FIGS. 1 or 10 with the suffix "b", respectively. The elements not specifically explained are to be referred to in the previous explanation disregarding the suffix "b". It should be noted that, in grooves 16'b and 17'b, there is no provision of blades and they are just merely grooves and provided with fluid passages 18 and 19, respectively which communicate with the lower pressure portion of the lubricating fluid. The passages 18 and 19 are provided with throttling portions 21 and 22, respectively. The cross sectional view taken along the line XIII—XIII in FIG. 12 is shown in FIG. 13. The situation illustrated in FIG. 13 is also similar in the cross section taken along the border between the intermediate ring 4b and the seat sleeve 5b. As viewed in FIG. 13, a plurality of axial through holes 23 are circumferentially provided in the rotary ring 2b. Also, in the intermediate ring 4b and the seat sleeve 5b, axial through holes 24 and 25 are similarly provided, respectively. In the housing 6b, an inlet port 26 is provided for the lubricating fluid to be lead to the seal chamber 10b.

In this embodiment, a part of the fluid circulating through the cascade 11b, groove 16'b and cascade of blades 12b and that circulating through the cascade of blades 13b, groove 17'b and the cascade of blade 14b pass the passages 18 and 19 having the throttling portions 21 and 22 to the lower pressure portion. The amount of the fluid discharged to the lower pressure portion is regulated by the throttling portions 21 and 22. Whilst the fluid supplied from the inlet port 26 is directed to the gap between the intermediate ring 4b and the seat sleeve 5b through the holes 25 and is sucked into the cascade 13b, a part of the fluid passed through the holes 24 is also sucked into the cascade 11b and the remaining fluid is discharged to the chamber 10b.

The rotating torque and the reaction torque transmitted to the intermediate ring 4b are regulated by or are dependent on the amount of the fluid passing through the passages 18 and 19. Also, the fluid in the cascades 11b, 12b, 13b and 14b is always circulated and discharged outwardly and, therefore, the fluid serves to remove the generated heat. Also, the fluid passing through the holes 23, 24 and 25 serves to dissipate the generated heat at the sliding interfaces 9b and 9'b and to cool the rotary ring 2b, intermediate ring 4b and the seat sleeve 5b.

Figure 14:
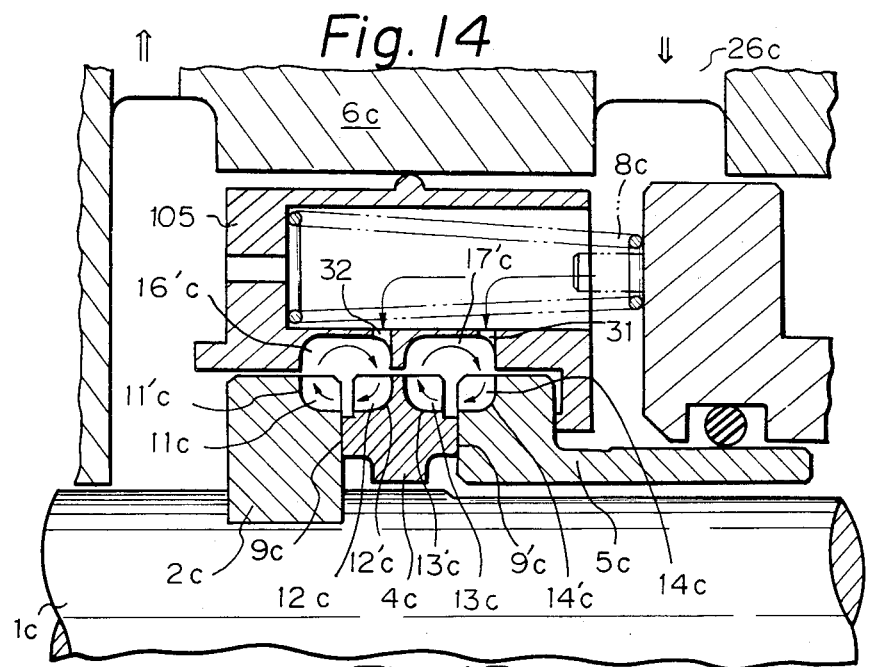
FIG. 14 illustrates a longitudinal cross sectional view of another embodiment employing a spring retainer.
Figure 15:
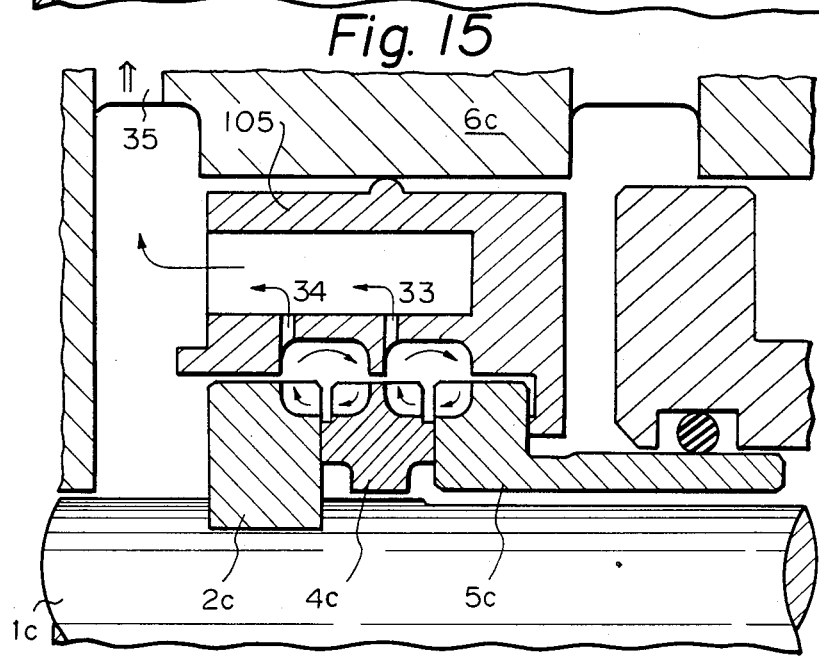
FIG. 15 illustrates a longitudinal cross section of the embodiment shown in FIG. 14 but sectioned in another plane.

In FIGS. 14 and 15, a further embodiment according to the present invention is illustrated. Although each of them is a longitudinal cross section of the same embodiment, they are sectioned at different angular orientations. As in the foregoing embodiments, members similar to those in the previous embodiments are given the same references as those in the previous drawings with a suffix "c", in each case. In this embodiment, a seat sleeve 5c is urged against an intermediate ring 4c and a rotary ring 2c by a plurality of springs 8c through a spring retainer 105. In this case, the retainer is held unrotatable and on its internal cylindrical surface is provided with grooves 16'c and 17'c within which no cascade of blades is provided in the same way as the grooves 16'b and 17'b in FIG. 12. On the respective outer peripheral surfaces of the rotary ring 2c, intermediate ring 4c and seat sleeve 5c, cascades 11c, 12c, 13c and 14c are provided within grooves 11'c, 12'c, 13'c and 14'c to oppose the grooves 16'c and 17'c. As seen in FIGS. 14 and 15, the cross sectional view of the combinations of the grooves 11'c, 12'c and 16'c, and the grooves 13'c, 14'c and 17'c resembles a somewhat rectangular shape, rounded at the corners. This shape is also another modification of the groove and blades. The sealing fluid is introduced from the inlet port 26c and directed to the coupling cascades 14c, 13c and the groove 17'c through a passage 31 provided in the retainer 105. Also, the fluid is introduced to the cascades 12c, 11c and the groove 16'c through a passage 32. The fluid in the grooves is circulated in the direction shown by arrows in FIGS. 14 and 15. Also, the fluid from the grooves 16'c and 17'c is directed to the lower pressure portion through passages 33 and 34 in the retainer toward an outlet port 356. Since the fluid is constantly circulated, heat dissipation and cooling are also to be expected in this embodiment.

Test data obtained from the embodiment represented by FIGS. 14 and 15 are shown in FIG. 16.

The test was conducted under the following conditions:

Each of the cascades 11c, 12c, 13c and 14c comprises 60 blades and the outer diameter of the cascades was 130 m/m. The mean diameter of the sliding interfaces 9c and 9'c was 115 m/m.

The number of springs 8c was eight and the surface pressure on the interface 9c or 9'c by the springs 8c was 1 kgf/cm$^2$.

The lubrication oil (Turbine Oil VG 32) was used as the sealing fluid and its feed rate was 20 /min. under a pressure of 2 kgf/cm$^2$ at 40° C.

The revolutions of the shaft 1c and the intermediate floating ring 4c were measured by using a magnetic pick-up. As seen from FIG. 16, when the revolutional speed of the shaft is below 5,000 r.p.m., the intermediate ring rotates at a speed slightly slower than the rotational speed of the shaft; however, if the rotational speed of the shaft exceeds beyond 6,000 r.p.m., the revolutional speed of the intermediate ring reaches half of the shaft speed and, at speeds of over 9,000 r.p.m. of the shaft, the intermediate ring rotates at approximately half of the shaft speed.

As explained in detail hereinabove, the intermediate floating ring rotates substantially stably at a rotational speed corresponding to an intersecting point A in FIG. 3, say at half the speed of the shaft speed, for example.

The effect above is obtained by a mechanical seal according to the present invention wherein two pairs of blade couplings each comprising an opposing cascade of blades are filled with fluid capable of transmitting torque even though forced circulating feed of the fluid is not applied. Therefore, the present invention is applicable to a mechanical seal where the forced circulation of the lubrication oil is not employed.

While the present invention has been explained in detail referring to the particular embodiments thereof, it should be noted that modifications and changes of the present invention are readily available to those skilled in the art within the sprit and scope of the present invention defined in the claims appended hereto.

For example, in the foregoing, explanation has been made on the cases where the number of intermediate rings was one. However, a plural number of intermediate rings may be employed in stacked relationship provided that a cascade of blades is provided on each opposing surface of the plural intermediate rings. In this case, a certain intermediate ring will rotate at the speed corresponding to the intersecting point of the curves for rotating torque at one interface and the reaction torque at the next interface of the coupling of the cascades of blades so that each of the plural intermediate rings may rotate at a substantially stable rotating speeds, respectively.

What is claimed is:

1. A mechanical seal comprising:
    a seal housing;
    a rotary ring securely mounted on a shaft within said housing for rotation with said shaft which extends through said housing;
    an intermediate floating ring disposed around said shaft within said housing and adjacent to said rotary ring so that said intermediate ring rotates freely and independently of said shaft; and
    a seat sleeve sealingly and unrotatably mounted in said housing and around said shaft and biased against said intermediate floating ring at the axially end surface thereof so that pressure is imposed on each of the sliding interfaces between the rotary ring and the intermediate floating ring and between the intermediate floating ring and said end surface of said sleeve;
    said mechanical seal being characterized in that, each of the opposing surfaces of the rotary, the intermediate floating ring and the axially end surface of the seat sleeve are slightly spaced from each other and are radially outward of the sliding interfaces, and each of the opposing surfaces is provided with annular grooves containing a plurality of blades disposed therein as a cascade of blades so that each pair of cascades of blades on the opposing surfaces form a fluid coupling.

2. A mechanical seal as claimed in claim 1 wherein said cascades of blades and annular grooves are formed at the outer corner edges on the opposing surfaces and said seal housing is provided with a cylindrical bore coaxially surrounding said rotary ring, intermediate floating ring and seat sleeve with a clearance therebetween, a circumferential groove is formed in the internal cylindrical surface of said bore at a portion opposing each of said fluid couplings, respectively and a plurality of blades are disposed therein so that a cascade of blades is formed in each of said circumferential grooves to cooperate with said cascades of blades in the rotary ring, intermediate ring and the seat sleeve.

3. A mechanical seal as claimed in claim 1 wherein said cascades of blades and annular grooves are formed at the outer corner edges on the opposing surfaces and said seal housing is provided with a cylindrical bore coaxially surrounding said rotary ring, intermediate floating ring and seat sleeve with a clearance therebetween, a circumferential groove is formed in the internal cylindrical surface of said bore at a portion opposing each of said fluid couplings, respectively, an inlet port and fluid intake passage means for sealing fluid are provided in said housing to direct fluid to said fluid couplings, and a fluid discharge passage is communicated with each of said circumferential grooves on the internal surface of said bore.

4. A mechanical seal as claimed in claim 1 wherein said cascades of blades and annular grooves are formed at the outer corner edges on the opposing surfaces, said seat sleeve being biased toward said intermediate ring through a spring retainer having a bore coaxially surrounding said rotary ring, intermediate ring and seat sleeve with a clearance therebetween, the internal cylindrical surface of said bore being formed with a circumferential groove thereon at a portion opposing each of said fluid couplings, respectively, each of said circumferential grooves being communicated with a sealing fluid inlet port and a sealing fluid outlet port.

5. A mechanical seal as claimed in any of claims 1, 2, 3 and 4 wherein plural intermediate floating rings are provided between the rotary ring and the seat sleeve, each of the plural intermediate rings being provided with a cascade of blades and a groove on the opposite side surfaces thereof.

6. A mechanical seal as claimed in claim 1 wherein, a plurality of blind holes are provided circumferentially in each of the opposing surfaces of said rotary ring, intermediate ring and seat sleeve in place of said annular grooves and cascade of blades.

* * * * *